US009914043B1

(12) United States Patent
Lu et al.

(10) Patent No.: US 9,914,043 B1
(45) Date of Patent: Mar. 13, 2018

(54) SYSTEM FOR ELECTRICAL PROPULSION OF A SKATEBOARD

(71) Applicants: Bin Lu, Saratoga, CA (US); Alan Lu, Saratoga, CA (US)

(72) Inventors: Bin Lu, Saratoga, CA (US); Alan Lu, Saratoga, CA (US)

( * ) Notice: Subject to any disclaimer, the term of this patent is extended or adjusted under 35 U.S.C. 154(b) by 0 days.

(21) Appl. No.: 15/424,833

(22) Filed: Feb. 4, 2017

(51) Int. Cl.
*A63C 17/12* (2006.01)
*A63C 17/01* (2006.01)
*B60K 7/00* (2006.01)

(52) U.S. Cl.
CPC ............ *A63C 17/12* (2013.01); *A63C 17/015* (2013.01); *B60K 7/0007* (2013.01); *A63C 2203/12* (2013.01); *B60K 2007/0092* (2013.01); *B60Y 2200/91* (2013.01); *B60Y 2400/112* (2013.01)

(58) Field of Classification Search
CPC ... A63C 17/12; A63C 17/015; A63C 2203/12; B60K 7/0007; B60K 2007/0092; B60Y 2200/91; B60Y 2400/112
USPC .......................................................... 180/167
See application file for complete search history.

(56) References Cited

U.S. PATENT DOCUMENTS

| 4,094,372 A | 6/1978 | Notter | |
|---|---|---|---|
| 5,330,026 A | 7/1994 | Hsu | |
| 5,691,584 A * | 11/1997 | Toida | B60K 7/0007 180/65.51 |
| 5,820,621 A | 10/1998 | Yale | |
| 5,893,425 A | 4/1999 | Finkle | |
| 8,801,003 B1 * | 8/2014 | Cassidy | A63C 17/0046 280/11.223 |
| 9,616,318 B2 * | 4/2017 | Rogers | A63C 17/12 |
| 2004/0163867 A1 | 8/2004 | Hillman | |
| 2011/0168465 A1 * | 7/2011 | Starr | B60K 7/0007 180/65.51 |
| 2011/0168466 A1 * | 7/2011 | Starr | B60K 7/0007 180/65.51 |
| 2013/0333985 A1 * | 12/2013 | Takachi | B62L 1/06 188/24.22 |
| 2014/0027192 A1 | 1/2014 | King | |
| 2014/0262574 A1 * | 9/2014 | Rodgers | A63C 17/12 180/167 |
| 2014/0326525 A1 * | 11/2014 | Doerksen | A63C 17/12 180/181 |
| 2016/0059108 A1 * | 3/2016 | Demolder | A63C 17/12 701/22 |
| 2016/0121198 A1 * | 5/2016 | Doerksen | A63C 17/01 701/22 |
| 2017/0056756 A1 * | 3/2017 | Pikulski | A63C 17/12 |
| 2017/0120139 A1 * | 5/2017 | Ma | B62K 11/007 |
| 2017/0144056 A1 * | 5/2017 | Evans | A63C 17/015 |
| 2017/0165561 A1 * | 6/2017 | Rogers | A63C 17/12 |
| 2017/0174096 A1 * | 6/2017 | Wang | B60L 15/02 |
| 2017/0252638 A1 * | 9/2017 | Ulmen | A63C 17/12 |

\* cited by examiner

*Primary Examiner* — James A Shriver, II
*Assistant Examiner* — Brian L Cassidy

(57) ABSTRACT

The system disclosed and claimed herein is an electric propelling wheel and battery/motor control subsystem enabling the retrofitting of a standard skateboard, having standard truck and wheels, with electrical propulsion capabilities.

2 Claims, 4 Drawing Sheets

SYSTEM FOR ELECTRICAL PROPULSION OF A SKATEBOARD

TECHNICAL FIELD

This invention is associated with skateboards.

BACKGROUND OF THE INVENTION

Skateboards are wheeled platforms typically less than 12 inches wide and less than 33 inches long, however, so-called long-board types are usually longer than 33 inches. Sets of wheels and wheel mounting structures (called "trucks") are placed on one surface of a rigid platform, called a deck, and oriented such that the deck will roll on the attached wheels in a direction essentially parallel to its side edges. Placed so that the wheels contact the ground, a user stands on the opposite surface of the deck and using a scooter-like one-footed propelling motion, or gravitational force on sloping ground, the user is transported along with skateboard in an intended path.

One can create an electrically propelled skateboard by replacing a truck and its wheels with a new truck having wheels that contain a motor within each. Powered by a battery, the wheel motors propel the skateboard by rotating the wheels. A standard truck, regardless of the distance between its wheels, has an axle that protrudes approximately 1.4 inches on each side of the truck cross-member base. This 1.4 inch axle is the one to which each wheel is mounted using a threaded nut. However, with an electric propulsion wheel, the internal motor width will exceed 1.4 inches in order to produce sufficient torque. Thus, in order to retrofit a skateboard for electric propulsion, the standard wheels and trucks are replaced by wheels and trucks specifically designed for electric propulsion. An alternative way would be to attach a motor to the truck and use a drive belt to link the motor and the wheels. As such, the wheels would need to be modified with a pulley or gear, and the truck would need to be modified for a mounted motor. In addition, a subsystem containing battery and control circuitry must also be mounted below the skateboard deck.

BRIEF SUMMARY OF THE INVENTION

The invention herein disclosed comprises an electric propulsion wheel or wheels adapted to fit on a standard 1.4 inch axle using a specialized nut fastened at the axle end; and a battery/motor control subsystem adapted to fit on the deck mounting bolts of a standard truck.

These two subsystems—electric propulsion wheel or wheels and battery/motor control—enable one to retrofit an existing skateboard by removing the standard wheel or wheels, mounting the battery/motor control subsystem to the existing truck's deck mounting bolts, installing electric propulsion wheel or wheels and connecting each's wiring to connectors on the battery/motor control subsystem.

Retrofitting can be done in just minutes, and reversed simply by disconnecting the wheel wires and replacing the electric propulsion wheel or wheels with standard wheel or wheels.

Thus, a skateboard can be retrofitted in less time and at less cost than replacing an existing truck in order to overcome the axle length limitation.

BRIEF DESCRIPTIONS OF THE DRAWINGS

DETAILED DESCRIPTION OF THE INVENTION

Ordinarily, a skateboard is propelled using one foot to push off the ground surface while standing on the deck with the other foot. On a ground surface sloping down in a desired direction of travel, one can use gravitational force to propel the skateboard and rider.

Innovations have been made in equipping a skateboard with electric propulsion. Essentially, each electrical propelling wheel contains a brushless DC hub motor in its core which is operative to rotate the outer wheel portion. The wheel is mounted to a truck axle such that the motor core is directly connected to the axle, and fixed in position, while the outer portion of the wheel is free to rotate under motor torque.

In order to generate sufficient torque, the motor core width dimension has a minimum width which is currently wider than the 1.4-inch length of an axle's threaded protrusion. Hence, new trucks with longer axles are used, instead, for mounting electrical-propelling wheels. Thus, to retrofit an existing skateboard with standard trucks and wheels, one must replace both the truck and its wheels. This is both time consuming and expensive.

Figure 1:
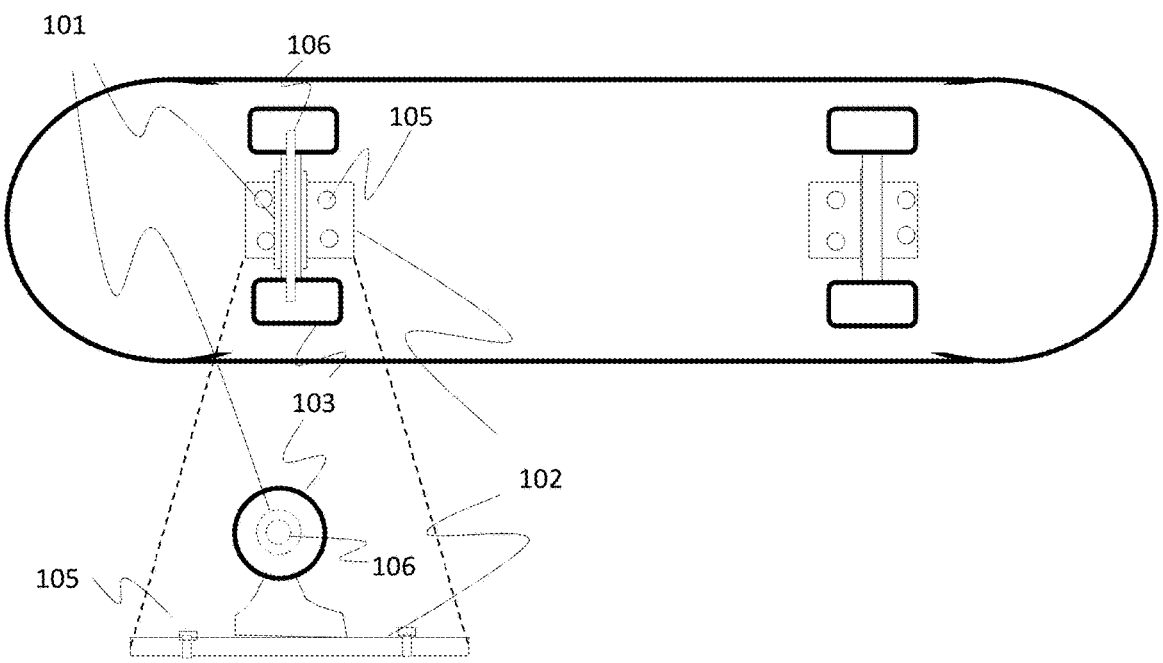
FIG. 1 is a bottoms-up view of a skateboard showing the pair of trucks and their wheels. An exploded view turned sideways shows the truck structure.

As shown in FIG. 1, a bottoms up view of the lower portion of a skateboard deck with two trucks and four wheels, the trucks are mounted to the deck using four or more mounting bolts (105). An axel (106) is situated inside an axle sleeve (101) and its ends protrude approximately 1.4 inches beyond the end of the axle sleeve on both ends. The axle is fixed to the axle sleeve and will not rotate axially. The axle ends that protrude from the axle sleeve are threaded.

Figure 2:
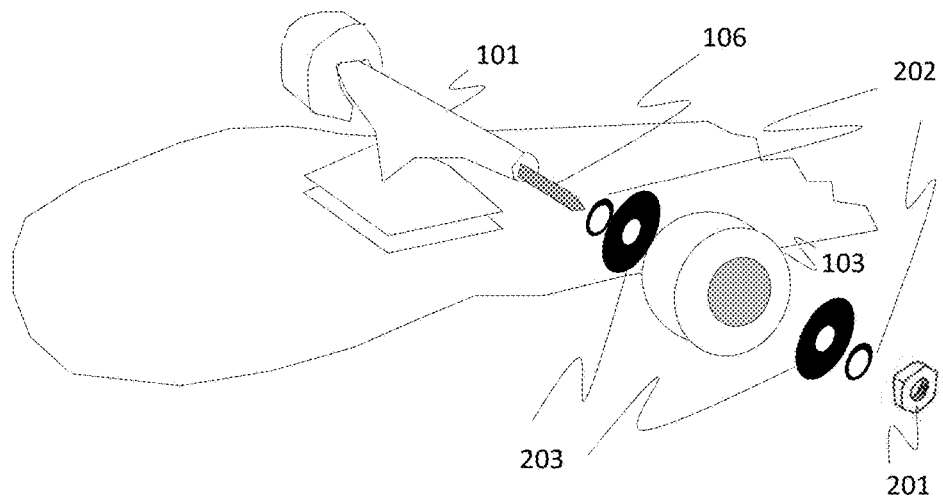
FIG. 2 illustrates how standard skateboard wheels are typically mounted to truck axles.

FIG. 2 illustrates how a standard wheel is mounted to the axle end (106) that protrudes beyond the axle sleeve (101). Washers (202) and (optionally) adaptive spacers (203) are placed on either side of the wheel as shown, and then the wheel is firmly affixed to the axle protrusion (106) using a nut (201). When so mounted, an inner wheel core surrounded by ball bearings is firmly attached to the axle protrusion (106) and remains fixed in place and does not rotate axially. The outer portion of the wheel rotates freely around that wheel core and the ball bearings provide stable, low-friction, rotation.

Standard trucks allow one to replace standard wheels simply by removing a nut, slipping the wheel off the axle protrusion, and replacing the wheel with another standard wheel and washers/spacers. It is then secured with a nut.

Standard trucks, however, cannot be used with electrical propelling wheels because of the motor core having a width greater than 1.4 inches. To outfit a skateboard with electrical propelling wheels, and their wider motors, one must also replace the standard truck with one specifically sized for the electrical propelling wheel.

Figure 3:
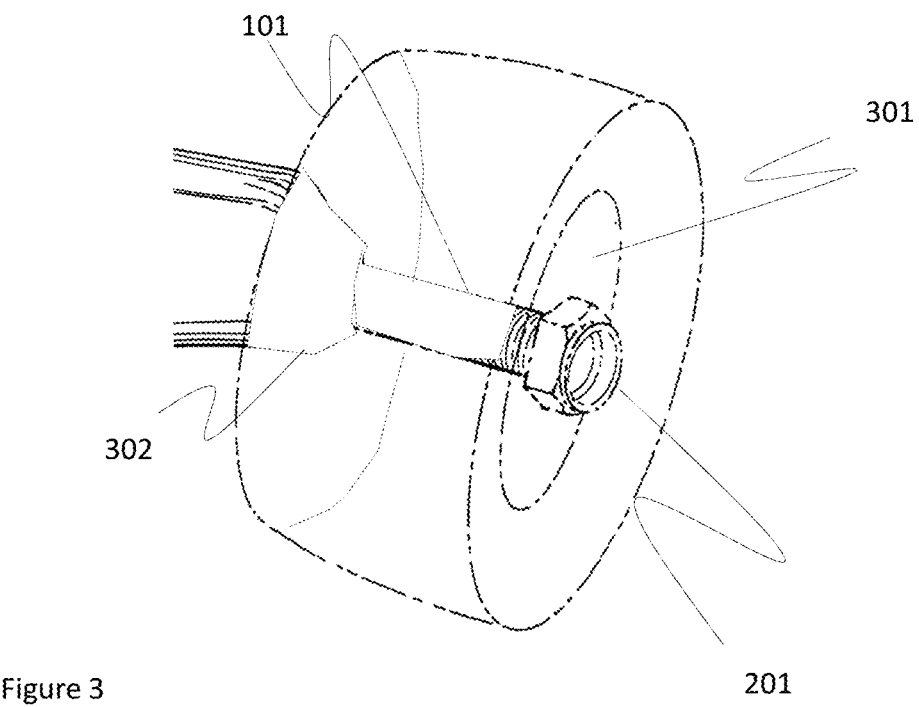
FIG. 3 shows how the wheels are wider than the axle length so on both the outward and inward facing surfaces of the wheel, the wheel structure is scalloped to allow the axle to extend through the wheel center allowing sufficient axle surface to extend outward such that a nut can be screwed onto it and hold the wheel firmly in place.

FIG. 3 illustrates a standard wheel mounted to a standard axle protrusion. Note the scalloped faces on both sides of the wheel that allow a wheel wider than 1.4 inches to be accommodated by an axle of 1.4 inch length.

Figure 4:
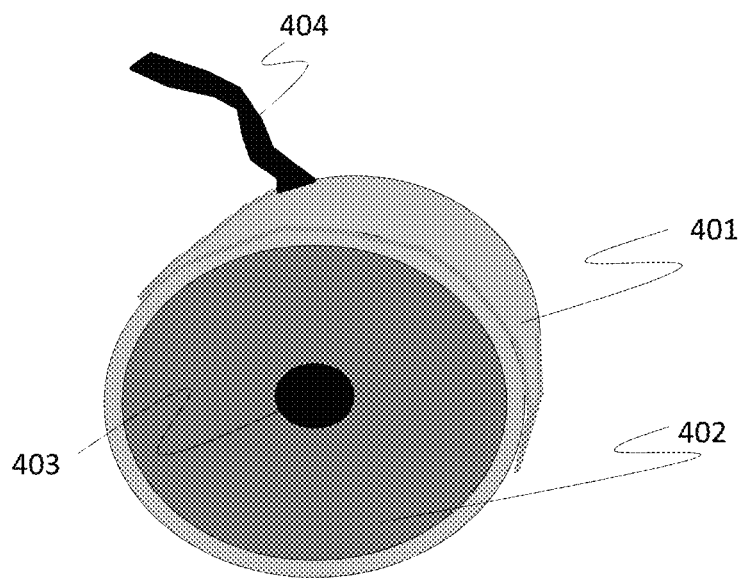
FIG. 4 shows an electric propulsion wheel with its inner core brushless DC motor and rotating outer surface and connecting wiring.

FIG. 4 illustrates an electrical propelling wheel. The motor core (402) is wider than 1.4 inches and has no scalloped out area. The outer wheel portion (401) is rotated by core motor torque. An axis tunnel (403) is used to attach the electrical propelling wheel to an axle protrusion on a truck designed for this wider motor hub dimension. And an electrical wire set (404) provides the electrical connection between the mounted wheel and a battery/motor control subsystem.

One embodiment of the invention herein disclosed (FIG. 5) uses a motor wide enough to provide sufficient torque (501) but having a smaller width tunnel (503) such that it will slip over an existing truck's 1.4 inch axle protrusion, offering sufficient support. In addition, this wheel's hub motor has an indented area (502) that will fit against the end of a standard truck axle sleeve. This wheel can then be affixed to the axle protrusion using a specialized nut with a threaded sleeve. This nut (504) will extend into the motor tunnel sufficiently far so as to engage the end of the axle protrusion and using the axle protrusion threads, provide a firm, rotation-free, attachment of the motor core and its electrical propelling wheel to that standard axle protrusion.

Figure 5:
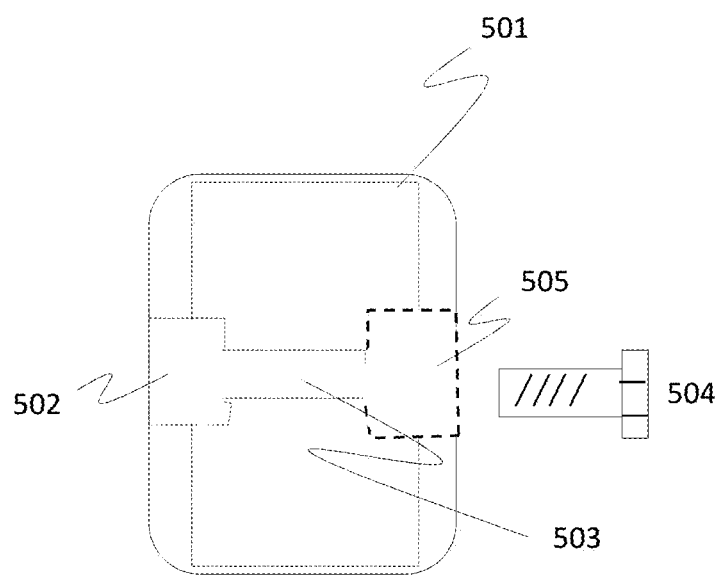
FIG. 5 shows an embodiment of the invention whereby the core motor tunnel allows a standard 1.4 inch axle to extend through it, and a specialized nut/sleeve fixture permits the wheel to be firmly mounted to a standard axle.
Figure 6:
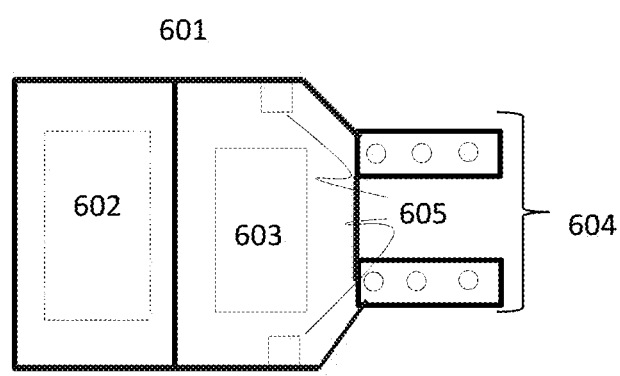
FIG. 6 shows a battery/motor control subsystem having two prong extensions operative to fit over existing truck-to-deck mounting bolts and be firmly mounted to the truck mounting structure.
Figure 7:
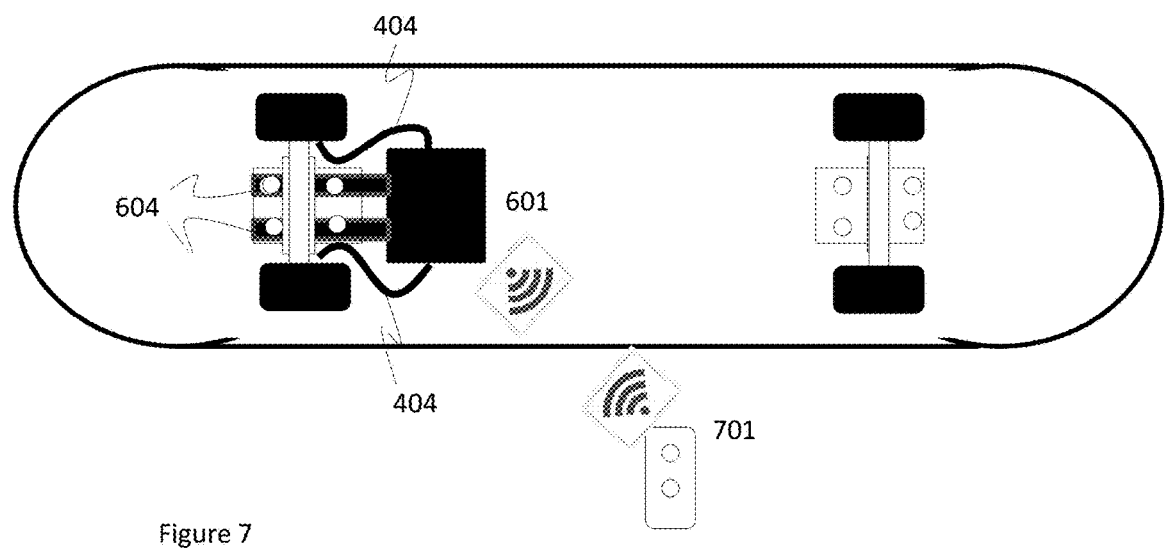
FIG. 7 illustrates a skateboard retrofitted with the wheels of FIG. 5 and the battery/control subsystem of FIG. 6 also showing a wireless remote control device 701.

Another subsystem associated with the embodiment of FIG. 5 is a battery/motor control subsystem (601) containing a battery (602) and motor-control circuitry (603) plus a pair of electrical connectors operative to connect to the wiring bundle (404) of an electrical propelling wheel. This battery/motor control subsystem is adapted with two extensions (604) that are sized and have holes that correspond to the positions of the deck mounting bolts on a standard truck. In addition, a wireless remote control unit (not shown) is used by the rider to control motor activation and speed. One can mount this subsystem to the standard truck's mounting bolts by slipping off the nuts, placing the subsystem such that it slips over the exposed bolt shafts, then replacing the nuts and tightening sufficiently. If the existing bolt shaft is not long enough, it can be replaced by a longer bolt. Once so mounted, the electrical propelling wheels can replace the standard wheels by removing the standard wheel nuts, slipping the standard wheels off the axle protrusions, slipping the electrical propelling wheels and any mounting hardware over the axle protrusions, then tightening each in place using the specialized nut (504). To reduce vibratory motion to the battery/motor control subsystem, a flexible pad or spring can be used to isolate it from deck vibrations.

The novelty of this invention stems from the adaptable electrical propelling wheel which safely mounts on a standard truck's axle protrusions. The battery/motor control subsystem can be attached without having to use a different or non-standard attaching process. Both the electrical propelling wheels and battery/motor control may be easily removed from one skateboard, and installed onto another one using standard trucks. Because retrofitting a skateboard for electrical propulsion requires no replacement, or modification, of a truck or trucks, it takes less time, and less cost to do so.

The electrical propelling wheel is now known in the art. Adaptation of such involves changes to core hub motor casing rather than electrical design. The specialized nut used to mount these wheels on standard truck axle protrusions should be sufficiently strong to provide adequate durability and may also use known structures for insuring the nut locks in place after tightening to avoid having it loosen during use. The case for the battery/motor control subsystem should be durable enough to avoid physical shock damage during use, and the extensions used to provide standard mounting should be sufficiently strong to avoid breakage or flexing during use. As already mentioned, the portion of the battery/motor control case that faces the bottom of the skateboard deck may be covered by a shock absorbing pad or spring to isolate it and its contents from deck vibration.

What is claimed is:

1. An electric propelling wheel or wheels comprising:
   an electric motor or motors located in the hub of said wheel or wheels operative to apply torque to the outer portion of said wheel or wheels, thereby causing said outer portion to rotate such that the axis of rotation is the center of said wheel or wheels;
   an axle tunnel through said motor or motors is operative to snugly encompass an axle protrusion extending beyond a truck axle sleeve end;
   an inward facing side of said wheel or wheels said motor or motors scalloped to precisely fit the contour of said truck axle sleeve end;
   an outward facing side of said wheel or wheels said motor or motors scalloped to enable a specialized nut to engage with and fasten to said axle protrusion's threaded end;
   said specialized nut having a threaded sleeve operative to be inserted into said axis tunnel from said outward facing side of said wheel or wheels;
   said specialized nut's said threaded sleeve sufficiently long so as to engage the said threaded end of said axle protrusion; and
   a set of wires extending from said motor or motors operative to convey motor control electricity from a battery/motor control subsystem to said wheel or wheels.

2. A claim as in claim 1 further comprising:
   said battery/motor control subsystem having internal battery and motor-control circuitry operative to provide controlled electrical energy to said wheel or wheels;
   said battery/motor control subsystem having extensions sized and spaced, and having holes sized and spaced, such that said battery/motor control subsystem may be mounted on the mounting bolts of a standard said truck;
   said battery/motor control subsystem having shock absorbing material or fixtures on a side that faces a bottom side of a skateboard deck;
   said battery/motor control subsystem having at least one electrical connector operative to connect to said set of wires from said wheel or wheels and convey said motor control electricity.

* * * * *